(12) United States Patent  (10) Patent No.: US 7,201,448 B2
Williamson et al.  (45) Date of Patent: Apr. 10, 2007

(54) HEADREST SUPPORT ASSEMBLY

(75) Inventors: John Williamson, Davie, FL (US); Pedro Meneses, Miami, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 10/960,353

(22) Filed: Oct. 6, 2004

(65) Prior Publication Data

US 2005/0121963 A1 Jun. 9, 2005

Related U.S. Application Data

(60) Provisional application No. 60/509,402, filed on Oct. 6, 2003.

(51) Int. Cl.
*A47C 7/36* (2006.01)

(52) U.S. Cl. ........................ 297/407; 297/410; 297/408

(58) Field of Classification Search ................ 297/391, 297/406, 407, 408, 410, 452.18
See application file for complete search history.

(56) References Cited

U.S. PATENT DOCUMENTS

| | | | | |
|---|---|---|---|---|
| 3,511,535 A | * | 5/1970 | Gunlock | 297/410 X |
| 4,519,650 A | * | 5/1985 | Terada et al. | 297/452.18 X |
| 4,545,618 A | * | 10/1985 | Kitamura | 297/410 X |
| 4,589,698 A | * | 5/1986 | Suzuki | 297/410 X |
| 5,364,164 A | * | 11/1994 | Kuranami | 297/408 X |
| 6,099,077 A | * | 8/2000 | Isaacson | 297/410 X |
| 6,467,846 B2 | * | 10/2002 | Clough | 297/410 X |
| 6,761,409 B2 | * | 7/2004 | Ford | 297/410 X |
| 6,883,870 B2 | * | 4/2005 | Jost | 297/408 X |

FOREIGN PATENT DOCUMENTS

| | | | | |
|---|---|---|---|---|
| JP | | 60148726 A | * | 8/1985 |
| JP | | 60148727 A | * | 8/1985 |

* cited by examiner

*Primary Examiner*—Anthony D. Barfield
(74) *Attorney, Agent, or Firm*—Drinker Biddle & Reath LLP

(57) ABSTRACT

A headrest support assembly for a seat apparatus capable of positioning the headrest in a variety of positions, including a position that provides headrest support to raise the head while the seat is in a reclined position.

23 Claims, 16 Drawing Sheets

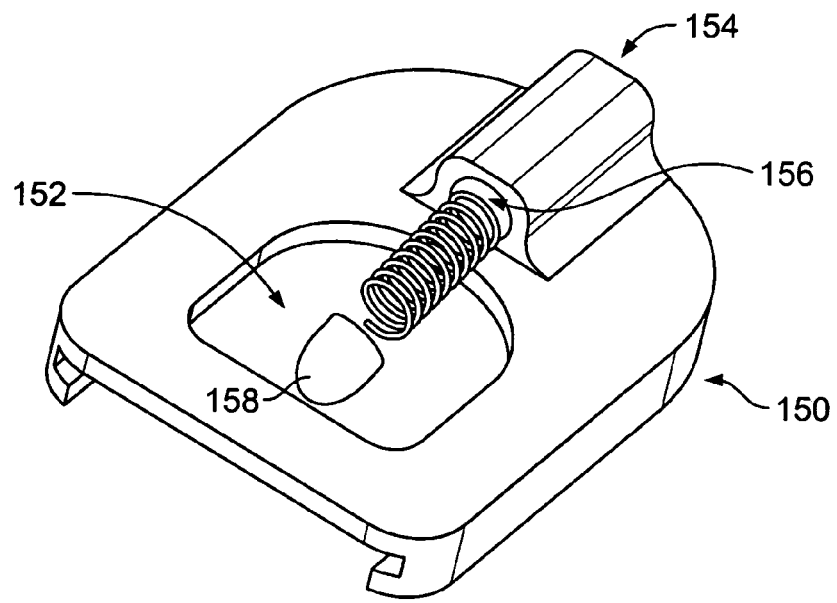
FIG. 16
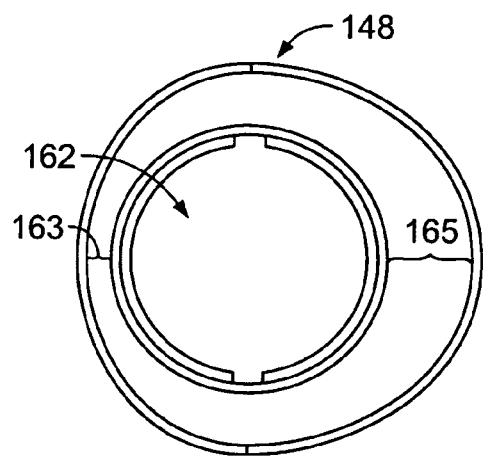
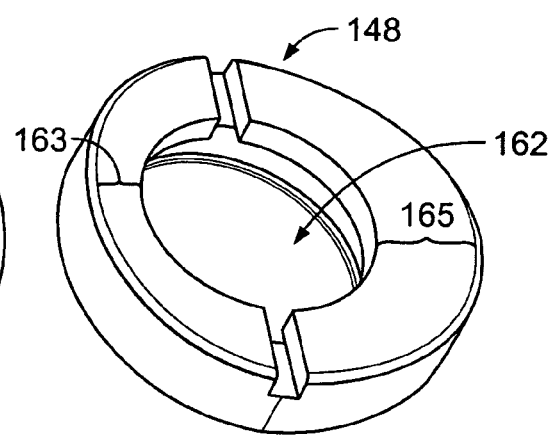
FIG. 17  FIG. 18

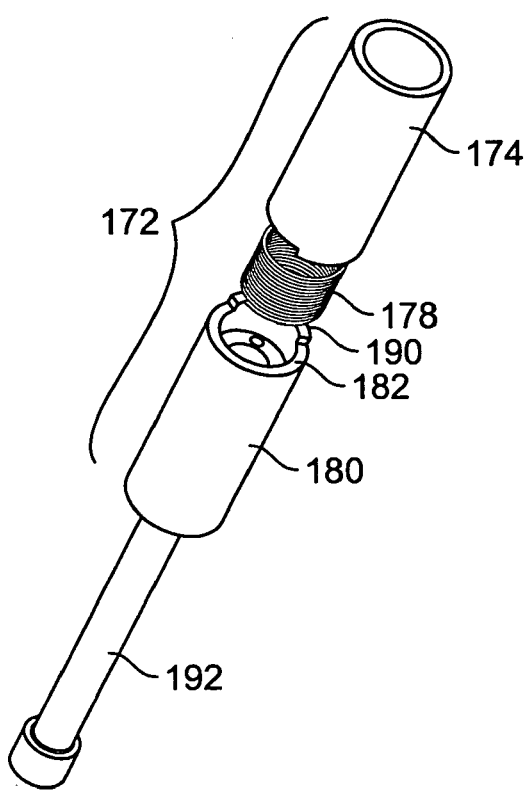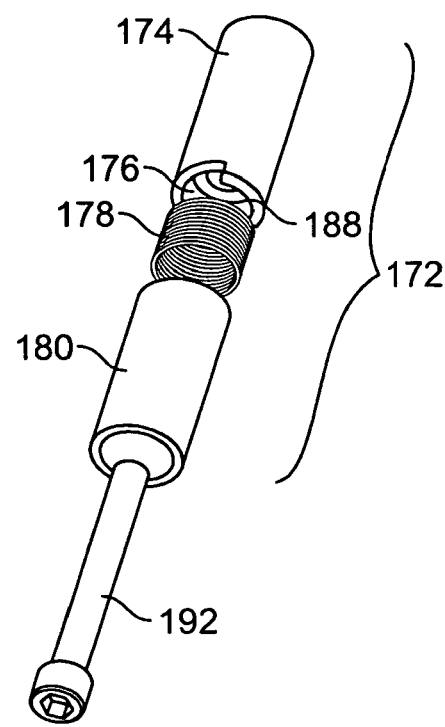
FIG. 22  FIG. 23

HEADREST SUPPORT ASSEMBLY

CROSS-REFERENCE TO RELATED PATENT APPLICATION

This patent application claims the benefit of U.S. Provisional Patent Application No. 60/509,402, filed Oct. 6, 2003, entitled Airplane Passenger Seat, the content of which is incorporated herein by reference.

FIELD OF THE INVENTION

This invention pertains to a headrest for use with a seating apparatus and, more particularly, to a headrest capable of movement in several directions to provide proper head support in any position.

BACKGROUND OF THE INVENTION

Seats on large passenger vehicles frequently have headrests for the comfort of passengers as they travel. Passengers on such vehicles are often in their seats for long periods of time, and may even be there for several hours without standing. Some of these seats may move to a reclined or horizontal position, allowing the passenger to rest or sleep more easily. Typical headrests, however, do not support a passenger's head in a raised position while the seat is horizontal or in a reclined position. Having the headrest in a raised position while the seat is reclined would allow passengers to comfortably watch a movie or read while in a reclined or horizontal position. A headrest in this position may also improve a passenger's ability to sleep while traveling. Typical headrests also fail to provide support on the sides of the headrest. Support on the sides of the headrest would enable a passenger to turn his or her head to either side and rest it against a headrest to reduce strain on the neck and increase comfort.

Additionally, seats on airplanes are required by the National Aircraft Standard to provide at least 36½ inches of back support in all passenger seats. Headrests are often used to extend the height of the seat back to the required minimum while limiting the weight of the seat on airplanes. Making these headrests adjustable in height provides an additional feature to make passengers more comfortable on their journey. Headrests also serve as important safety features in airplanes for seats that face the tail of the airplane. Typical headrests are connected to the seat and do not adjust to accommodate the various positions of the seat or the various positions a passenger may adopt while sitting or reclining.

Typical headrests are also difficult to adjust or remove from the seat. People vary in height, and the height of a headrest may be comfortable for one person and uncomfortable for others. Many typical headrests do not allow for a change in the height of the headrest. Even on headrests that can be adjusted for height, locking the headrest in place once the desired height is obtained is often difficult, if not impossible. Typical headrests are also difficult to remove entirely from the seat as may be required to replace a headrest. Frequently, removing a headrest requires disassembly of subassemblies of the seat, including removing any upholstery. Removing headrests from the seats to either repair them or to replace them without having to replace the entire seat would be an advantage over current headrests.

Accordingly, a need exists for a headrest capable of supporting a person's head in any position, including having the headrest in a raised position to support the head while the seat is in a reclined position. A need also exists for a way to lock a headrest in place at a desired height and to remove the headrest from the seat.

BRIEF SUMMARY OF THE INVENTION

An embodiment of the present invention is directed to a headrest support assembly for use with a seating apparatus. The headrest support assembly is comprised of a headrest support member positioned in a backrest of the seating apparatus and a headrest pivotally attached to the headrest support member.

Another embodiment of the present invention is directed to a headrest support assembly for use with a seating apparatus where the headrest support assembly is comprised of two headrest support members spaced apart from and positioned substantially parallel to one another in a backrest of the seating apparatus. This embodiment of the invention also includes a headrest pivotally attached to both of the headrest support members.

The invention also is directed to a locking mechanism for keeping the headrest in place and for moving the headrest to different positions or removing it from the seat. This locking mechanism for the headrest support assembly is comprised of a cam having an eccentric shape and an opening therethrough, a locking clip having an opening therethrough and an encasement located on a first surface of the clip. Additionally, this embodiment includes a spring located in the encasement, a cam contacting member positioned in the encasement adjacent to the spring.

The invention also involves a release mechanism of a headrest assembly that allows the headrest to be completely removed from the seat back. The release mechanism is comprised of a first support housing, a headrest release mechanism in contact with the first support housing, the headrest release mechanism including a first section having an end portion capable of receiving a spring that is attached to the end portion, and a second section having an end portion proximal to the first section, said end portion of the second section capable of attaching to the spring, and a second support housing connected with the first support housing, the second support housing having a notch therein.

BRIEF DESCRIPTION OF THE DRAWINGS

These and other advantages and novel features of the present invention will be more readily appreciated from the following detailed description when read in conjunction with the accompanying drawings, in which:

FIG. 16 is a top perspective view of the locking clip portion of the locking mechanism shown in FIG. 10;

FIG. 17 is a bottom perspective view of the cam portion of the locking mechanism shown in FIG. 10;

FIG. 18 is a top perspective view of the cam portion of the locking mechanism shown in FIG. 10;

FIG. 22 is a perspective view of the headrest release mechanism;

FIG. 23 is another perspective view of the headrest release mechanism.

DETAILED DESCRIPTION OF THE INVENTION

Figure 1:
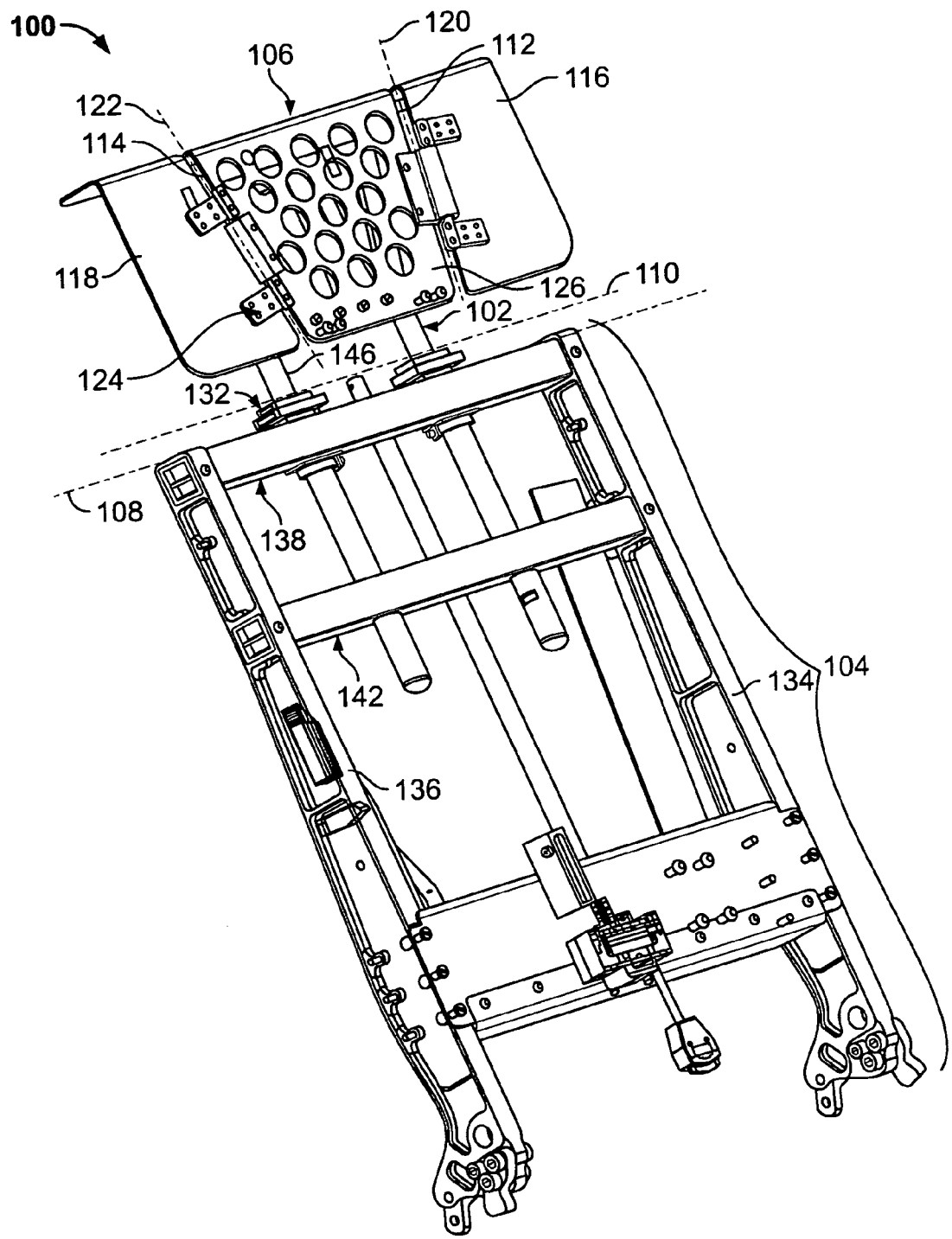
FIG. 1 is a schematic front view showing a headrest support assembly according to an embodiment of the present invention.
Figure 2:
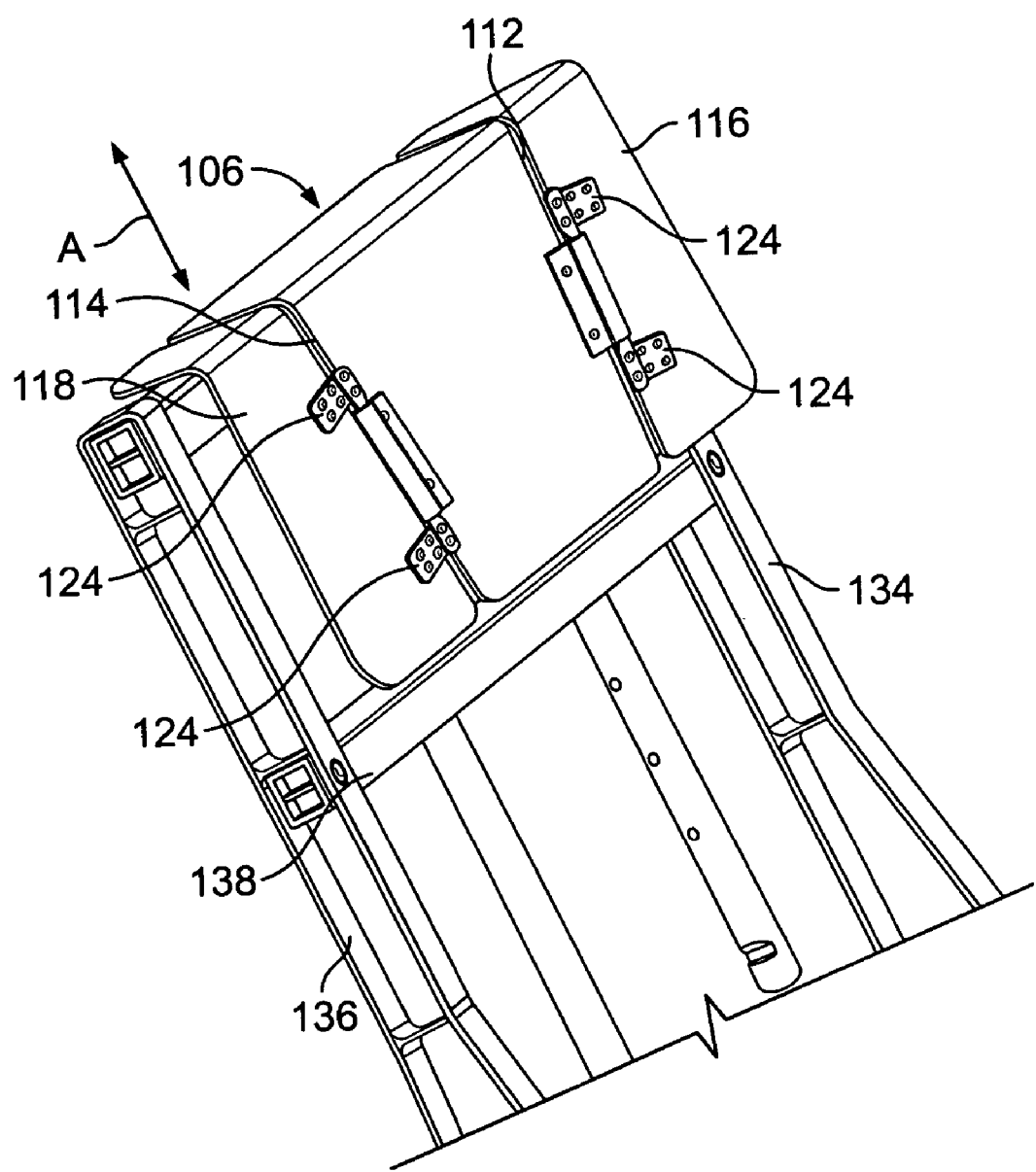
FIG. 2 is a schematic side view of the headrest support assembly shown in FIG. 1.

The invention shown in FIGS. 1–23 is directed to a headrest support assembly 100, in particular to a headrest support assembly 100 capable of adjusting to lift the headrest 106 to a raised position when the backrest 104 is in a reclined position. FIGS. 1–9, 14 and 19 show an embodiment of the invention that is directed to headrest support assembly 100 for use with a seating apparatus. The headrest support assembly 100 is comprised of a headrest support member 102 positioned in a backrest 104 of the seating apparatus and a headrest 106 pivotally attached to the headrest support member 102. This headrest support assembly 100 can also pivot in a way so that the head will be supported in any number of positions, including propping up the head while the seat is in a reclined position. To pivot in this manner, the headrest pivots about an axis 110 substantially parallel to an axis tangent to the top surface of the backrest 108.

Figure 19:
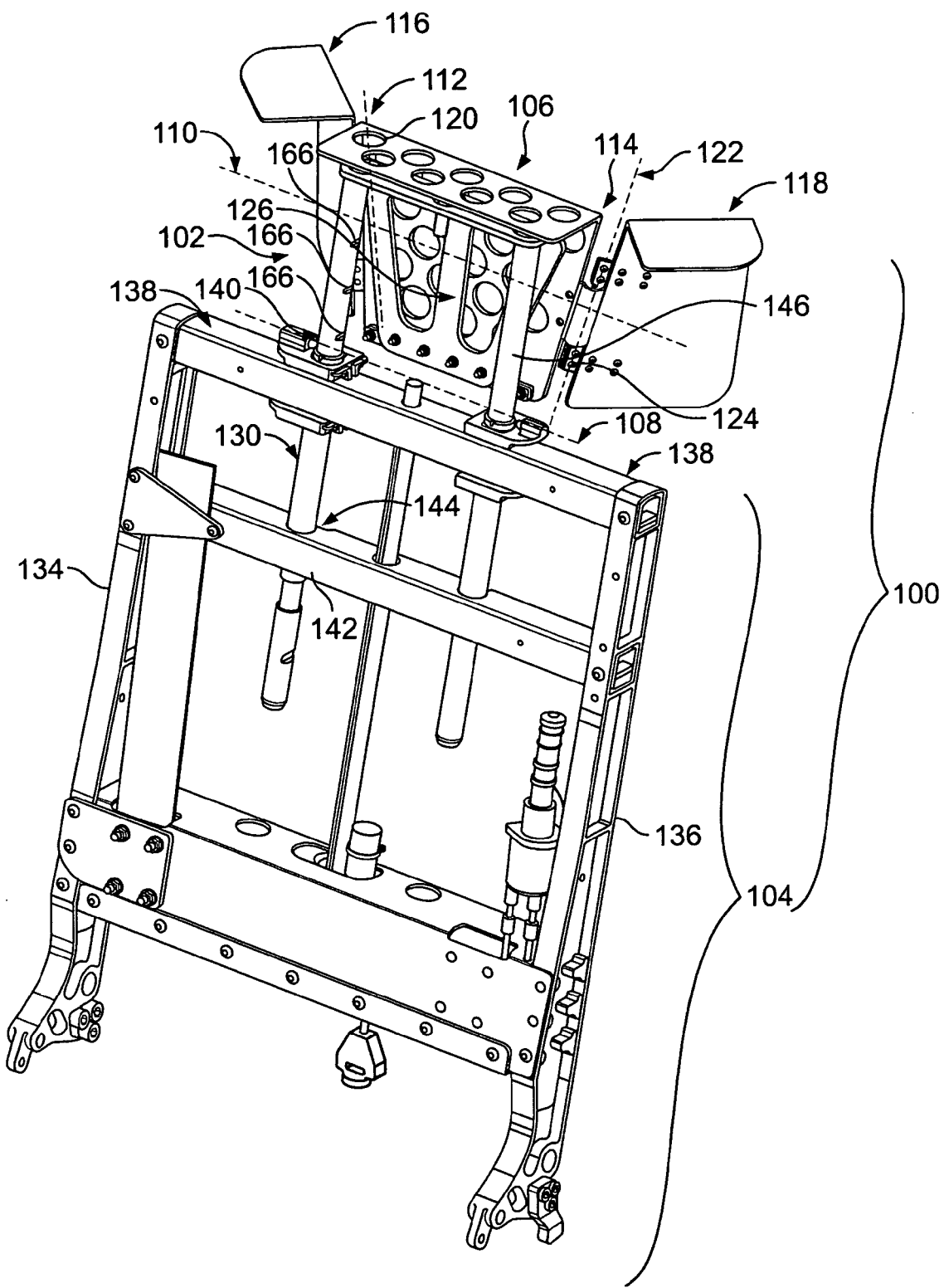
FIG. 19 is a back perspective view of the headrest support assembly shown in FIG. 1.

As illustrated in FIGS. 1–9, 11, 14 and 19, the headrest support assembly 100 can include side headrest portions 116 and 118 on the inboard 112 and outboard 114 sides of the headrest 106. The first side headrest portion 116 is pivotally connected to the inboard side 112 of the headrest 106. The second side headrest portion 118 is pivotally connected to the outboard side 114 of the headrest 106. The first and second side headrest portions 116, 118 pivot about their respective axes 120, 122 that intersect the axis 108 that is tangent to the top surface of the backrest 106. As shown in FIGS. 1 and 19, the axes on which the side headrest portions 116, 118 pivot can also be substantially perpendicular to the axis 108 that is tangent to the top surface of the backrest 106. The side headrest portions 116, 118 may be attached to the headrest 106 in any of several ways. For example, FIGS. 1–9, 11, 14 and 19 show the side headrest portions 116, 118 joined to the headrest 106 by hinges 124 thereby allowing the side headrest portions 116, 118 to pivot about their respective axes 120, 122. The hinges 124 connecting the side headrest portions 116, 118 to the headrest 106 may be friction hinges. Friction hinges allow the side headrest portions 116, 118 to pivot about their respective axes 120, 122 yet support a person's head when pivoted away from a position flush with the headrest 106. When in use, the seat occupant merely has to pull the desired side headrest portion or wing 116, 118 toward them to position the wing at the desired angle for comfort.

The headrest support member 102 can be of varying lengths without departing from the scope and spirit of the invention. In one example of the invention, the headrest support member 102 is approximately 14 inches long. Having a headrest support member 102 of this length will provide flexibility in the distance between the backrest 104 and the headrest 106 to accommodate and provide head support for people of all heights. In this example, the headrest support member is approximately ¾ inch in diameter. A headrest support member may be more or less than ¾ inch in diameter and still function properly depending on the particular needs and composition of the seat without departing from the spirit and scope of the invention.

When in operation, the seat occupant may adjust the headrest 106 to support his or her head at any appropriate height. In order to accomplish this, the headrest support member 102 moves up and down in approximately the same plane as the backrest 104, as shown by the arrow A in FIG. 2. This upward and downward movement is achieved, in one embodiment, by positioning the headrest support member 102 in a telescoping relationship with a support housing 130. This allows the seat occupant to adjust the headrest support member 102 by pulling up or pressing down on the headrest 106, thereby allowing the headrest support member 102 to extend or retract in the plane defined by the backrest 104.

Figure 3:
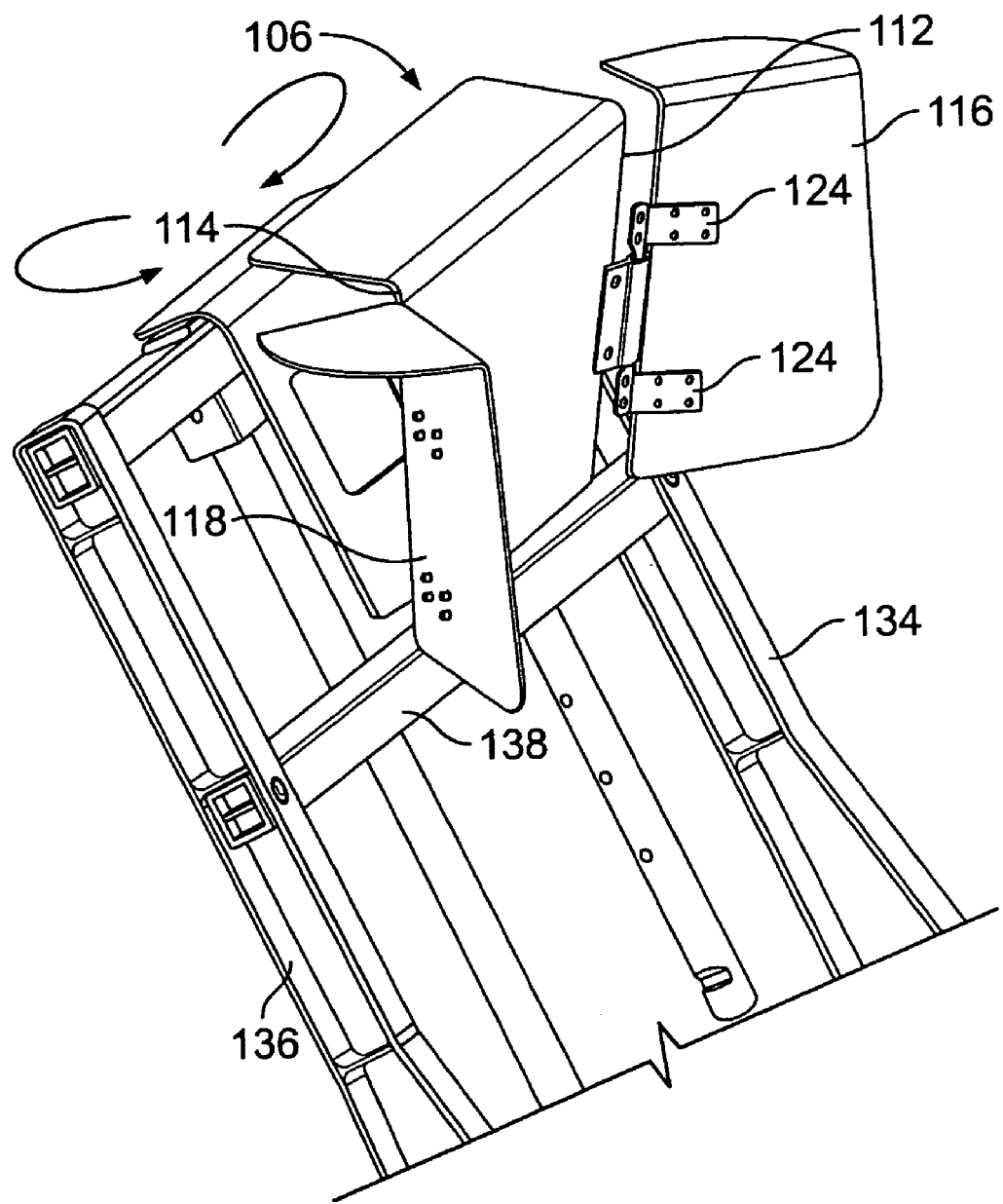
FIG. 3 is a schematic side view of the headrest support assembly showing the headrest pivoted forward with respect to the seat back, and the sides sections of the headrest pivoted with respect to the main section.
Figure 4:
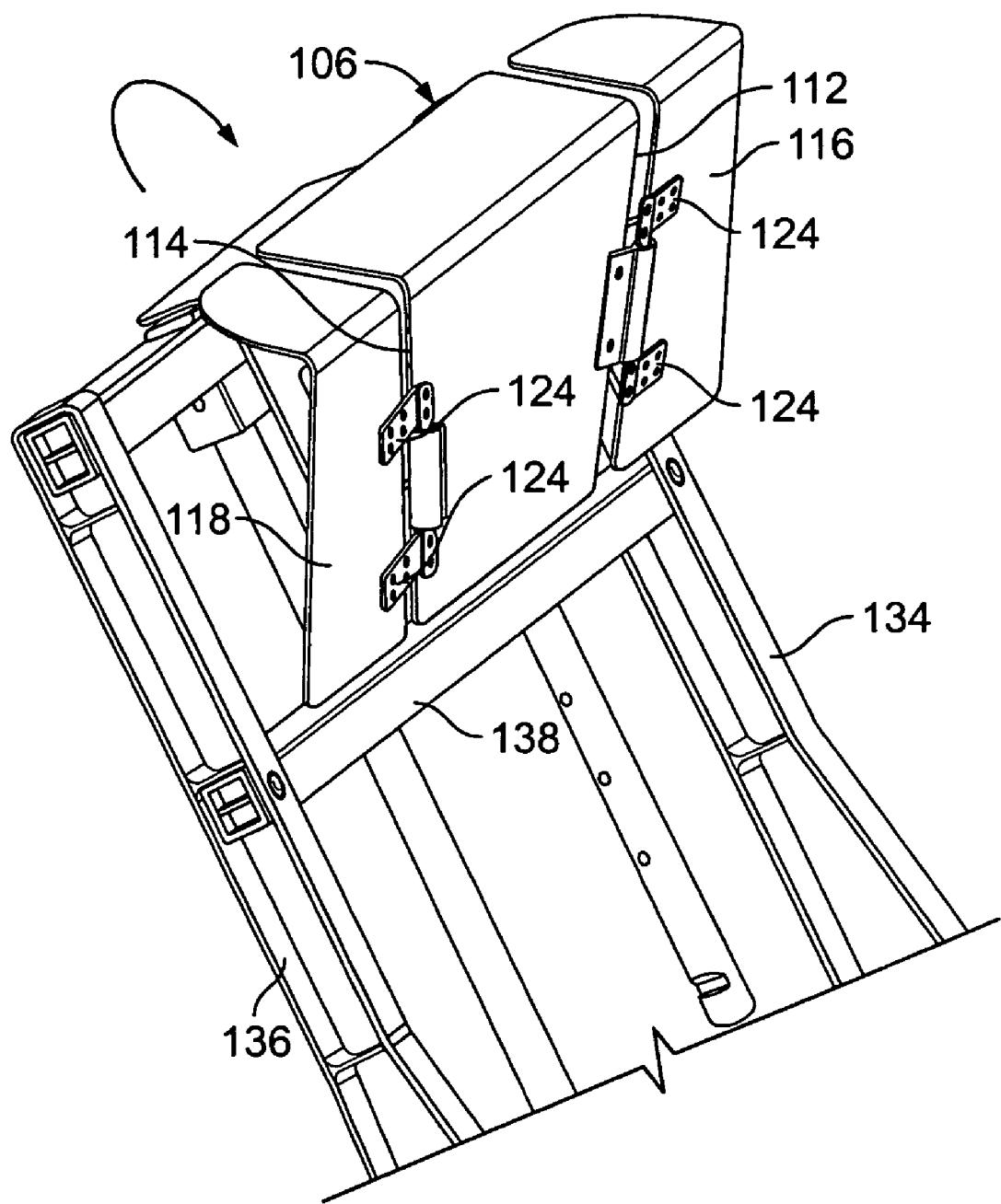
FIG. 4 is a schematic side view of the headrest support assembly showing the headrest pivoted forward with respect to the seat back, and the sides sections of the headrest flush with respect to the main section.
Figure 5:
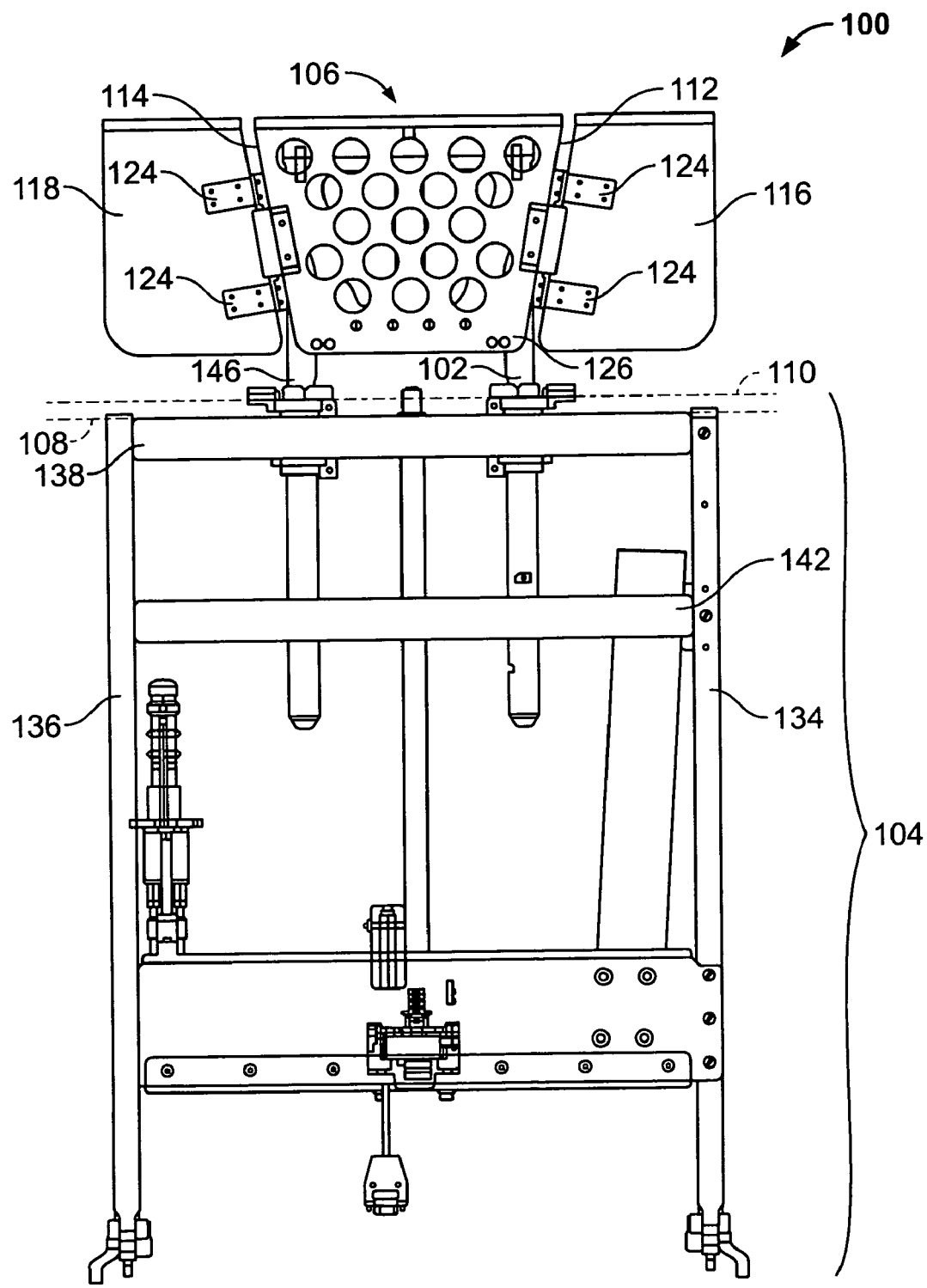
FIG. 5 is a schematic showing the front side of the backrest.
Figure 7:
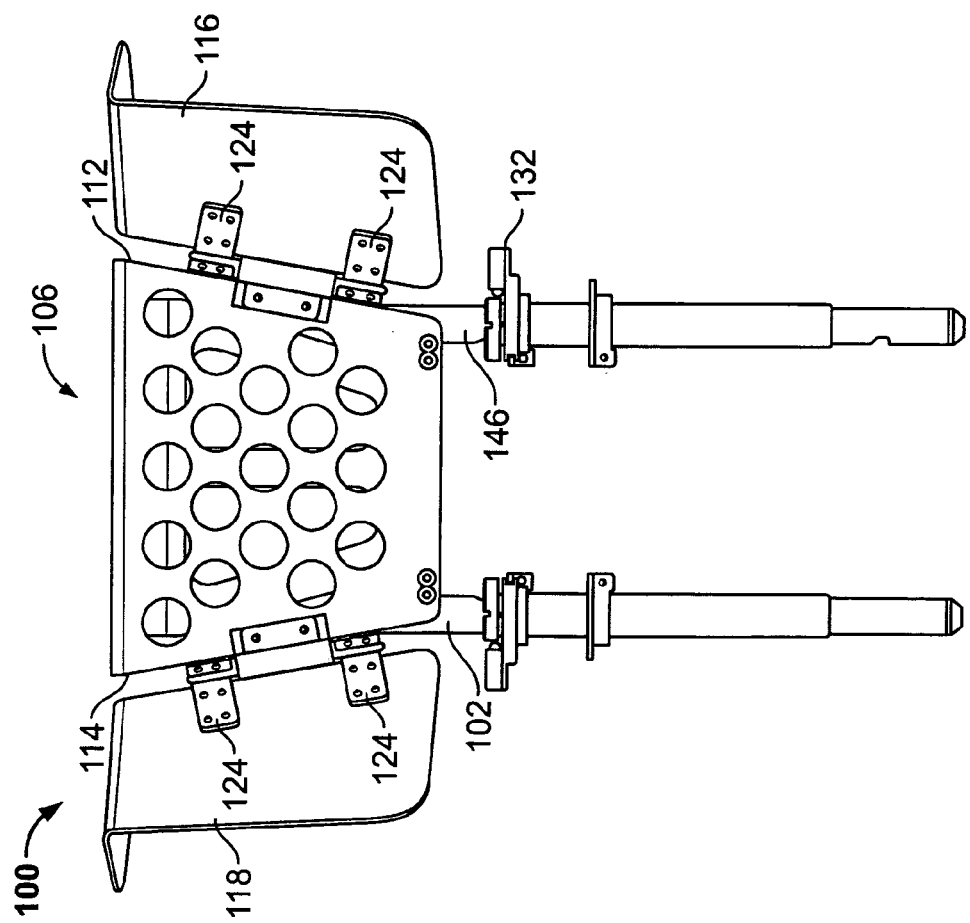
FIG. 7 is a front perspective view of the headrest support member shown in FIG. 1.
Figure 6:
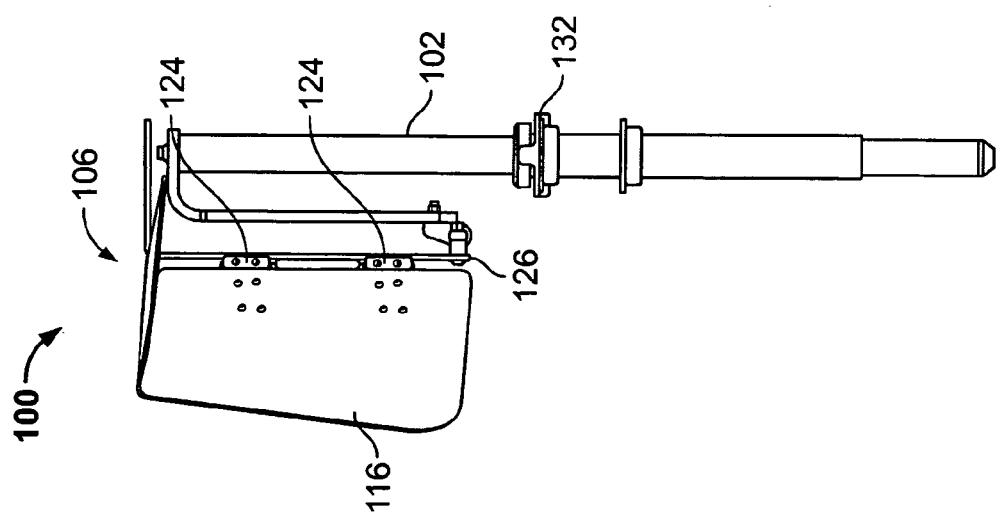
FIG. 6 is a side perspective view of the headrest support member shown in FIG. 1.

In addition to being raised and lowered with respect to the plane defined by the backrest 104, the headrest 106 may also be pivoted so as to prop up the head of the seat occupant when the backrest 104 is in a reclined or fully reclined position. This is accomplished by having the occupant pull forward on the headrest 106 with respect to the backrest 104 when the backrest is in a substantially vertical position, as shown in FIG. 3. Of course, should the backrest be in a reclined or fully reclined position, the headrest 106 would be adjusted by pulling the top of the headrest 106 in more of a vertical as opposed to forward direction.

As shown in FIGS. 1 and 5–11, the headrest support member 102 and the support housing 130 may be tubular in shape to facilitate this telescoping movement. The headrest support member 102 and the support housing 130 may also be made of plastic, which may be useful especially in vehicles, such as aircraft, where the additional weight of metal could be problematic.

In an embodiment of the present invention, the headrest support assembly 100 can also include a mounting bracket 126 attached to the headrest support member 102, as shown in FIG. 1 and 5–8. This mounting bracket 126 can be used to connect the headrest support member 102 to the headrest 106, thereby increasing the mobility and head support of the headrest 106.

As seen in FIGS. 1–5 and 19, the backrest 104 has first and second side rails 134 and 136 spaced apart from and substantially parallel to one another. A first support bracket 138 connects the first side rail 134 to the second side rail 136, the support bracket 138 includes an opening 140 therethrough. The headrest support member 102 then extends through the opening 140 in the first support bracket 138 to connect the headrest support assembly 100 to the backrest 104. The backrest 104 may be further defined by adding a second support bracket 142 spaced apart from and substantially parallel to the first support bracket 138. As shown in FIG. 19, this second support bracket 142 connects the first side rail 134 to the second side rail 136 and also has an opening therethrough 144 that is substantially aligned with the opening 140 in the first support bracket. When there are two support brackets 138 and 142 in the backrest 104, the headrest support member 102 extends through the openings 140, 144 in the first 138 and the second 142 support brackets, respectively, to be held steady in the backrest 104.

Another embodiment of the invention, as shown in FIGS. 1, 5, 7, 9, 11, 14 and 19, is a headrest support assembly 100 comprising a first headrest support member 102 and a second headrest support member 146. These two headrest support members 102 and 146 are spaced apart from and positioned substantially parallel to one another in a backrest 104. Additionally, a headrest 106 is pivotally attached to both of the headrest support members 102 and 146. All the features available for a headrest support assembly 100 with only one headrest support member 102 are also available for a headrest support assembly 100 with two headrest support members 102 and 146. For example, a headrest support assembly 100 comprised of two headrest support members 102 and 146 positioned in a backrest 104 of the seating apparatus and a headrest 106 pivotally attached to the headrest support members 102 and 146. The headrest 106 can then pivot about an axis 110 substantially parallel to an axis 108 tangent to the top surface of the backrest 104.

Figure 12:
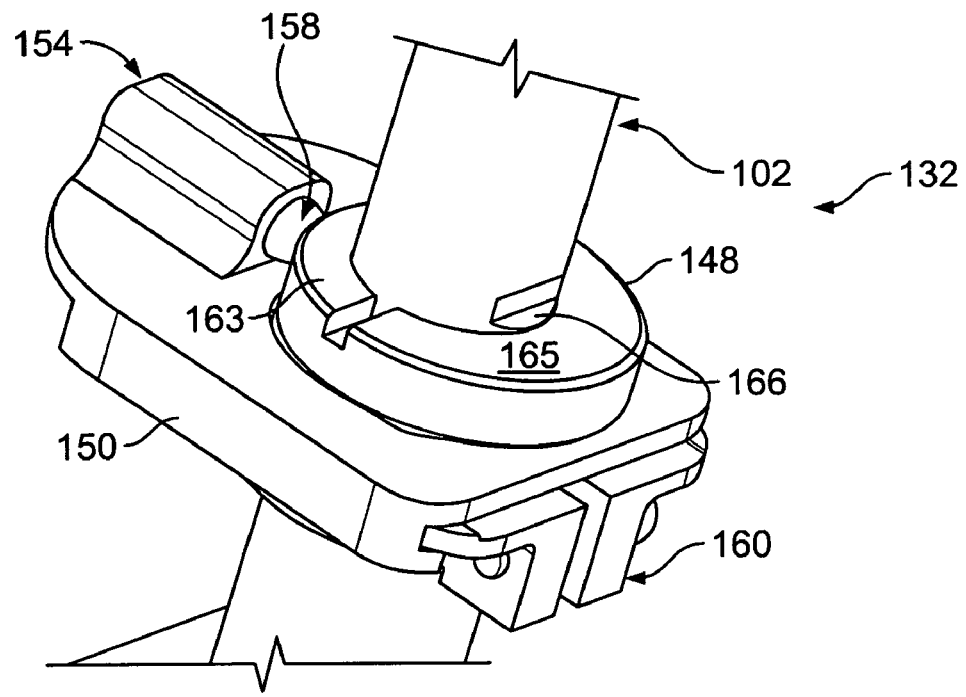
FIG. 12 is a side perspective view of the locking mechanism shown in FIG. 10.
Figure 13:
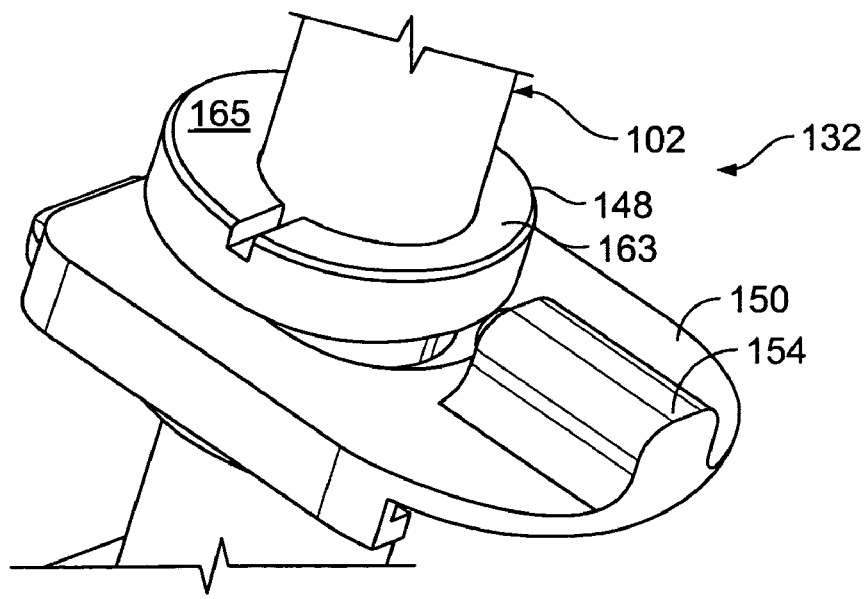
FIG. 13 is a side perspective view of the locking mechanism shown in FIG. 10.
Figure 14:
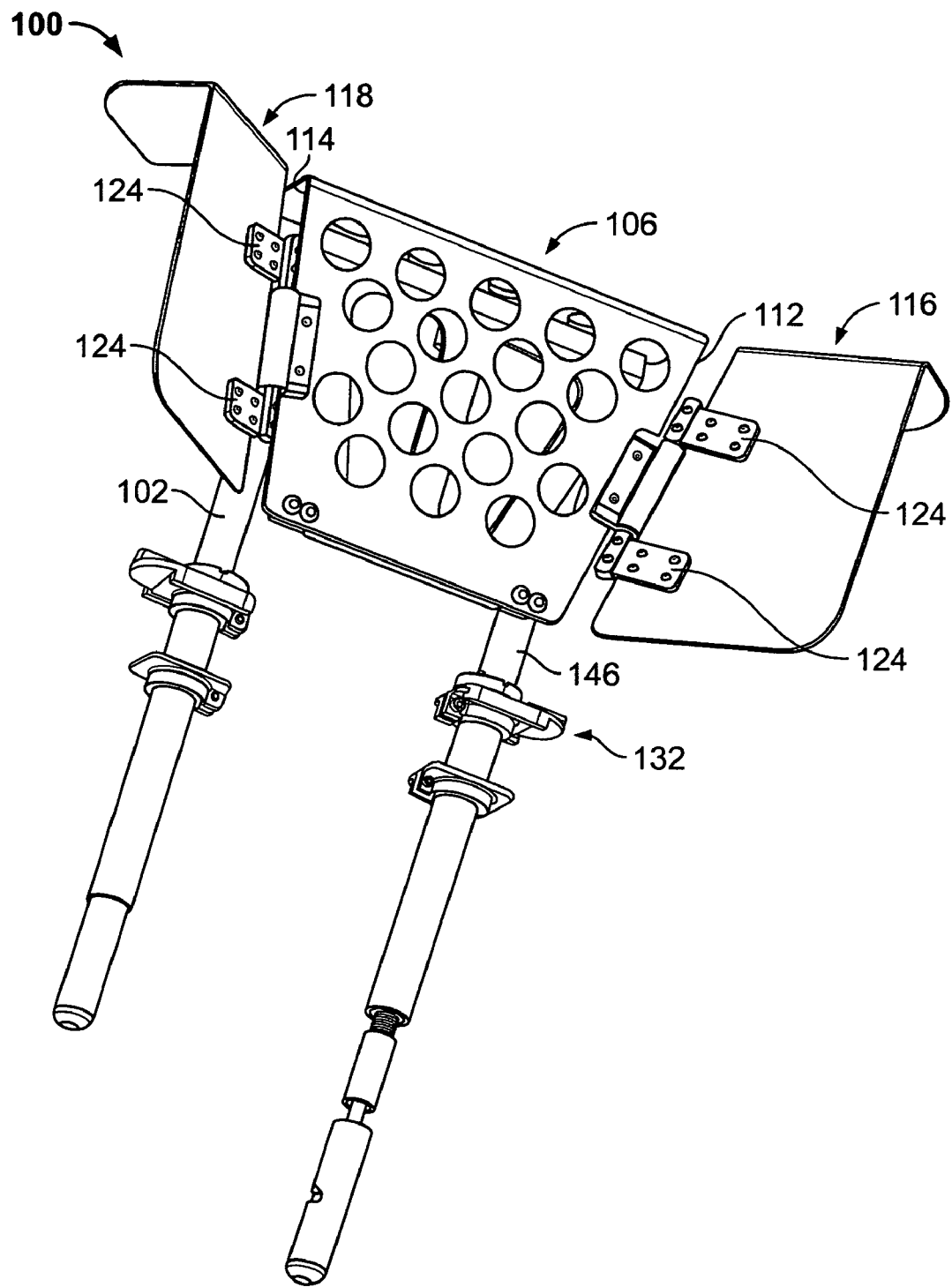
FIG. 14 is a front perspective view of the headrest support assembly shown in FIG. 1.

In yet another embodiment of the invention, a locking mechanism 132, as shown in FIGS. 12–14, is used to secure the headrest 106 in position at various heights above the top surface of the backrest 104. The locking mechanism 132 is comprised of a cam 148 having an eccentric shape with an opening 162 therethrough, as shown in FIGS. 17 and 18, and a locking clip 150 having an opening 152 therethrough, as shown in FIG. 16. The eccentric shape means that one side 163 of the cam 148 between the opening and the edge is narrower than the other side 165, as shown in FIGS. 17 and 18. An encasement 154 is located on a first surface of the locking clip 164, and the opening in the locking clip 152 is placed in registry with the opening in the cam 162, as shown in FIGS. 12 and 13. As shown in the extracted view in FIG. 16, a spring 156 is located in the encasement 154 while a cam contacting member 158 is positioned in the encasement 154 adjacent to the spring 156.

A headrest support member 102 extends through the openings in both the locking clip 152 and the cam 162, as shown in FIGS. 1 and 12–15. This headrest support member 102 includes a plurality of notches 166 spaced apart along its length, each of which is capable of receiving the locking clip 150. The locking mechanism 132, including the cam 148 and locking clip 150, may be manufactured from a number of suitable materials including, but not limited to, plastic. The cam contacting member 158 may be formed in any suitable shape including, but not limited to, a bullet shape.

Figure 15:
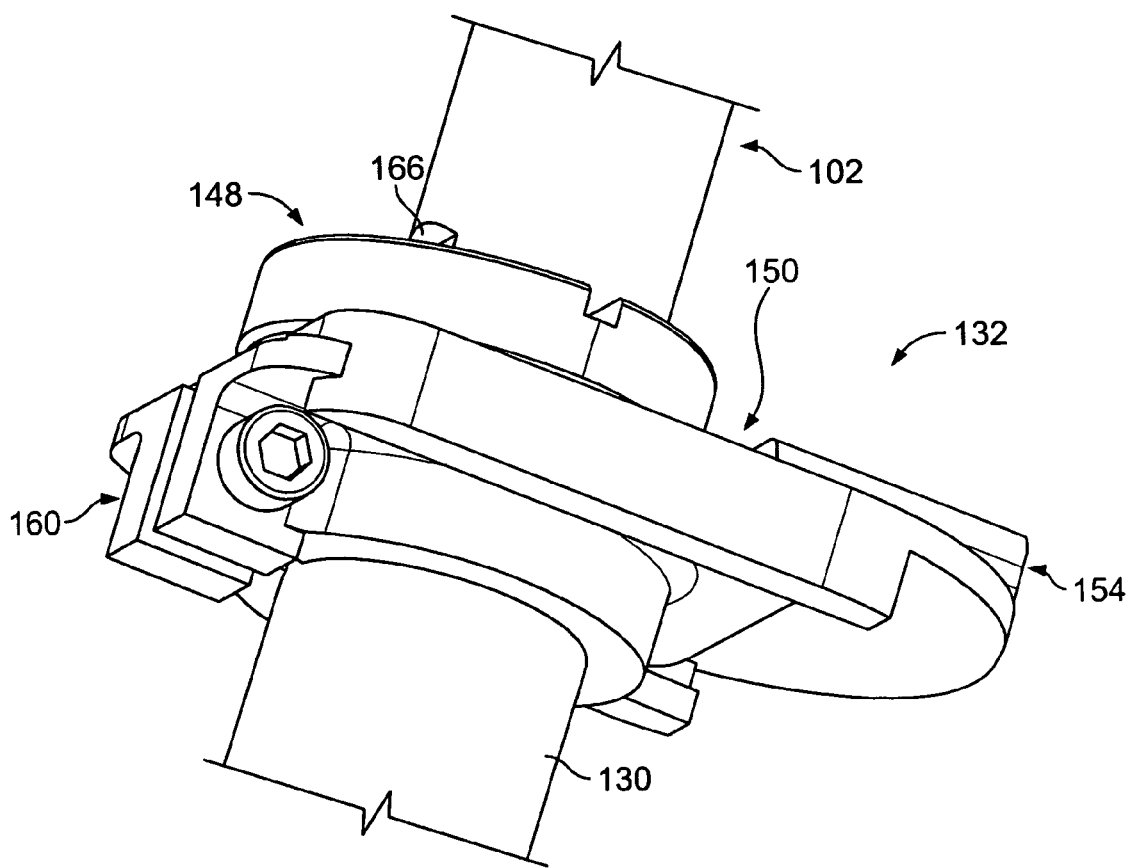
FIG. 15 is a bottom perspective view of the locking mechanism shown in FIG. 10.

The locking mechanism 132 may also be attached to a support housing 130 that surrounds the headrest support member 102. For example, as shown in FIGS. 11 and 15, the locking clip 150 may be connected to the support housing 130, and the cam 148 positioned on the locking clip 150.

When in operation, the seat occupant rotates the cam 148 so that the narrower side 163 of the cam 148 is adjacent to the cam contacting member 158. This causes the spring 156 to extend, thereby tending to force the wider side 165 of the cam 148 out of the notch 166 in the headrest support member 102. This makes it easier for the occupant to raise and lower the headrest support assembly 102 as the cam 148 is not deeply seated in the notch 166. In order to increase tension on the spring 156 and thus more firmly lock the headrest support member in place, the occupant can rotate the cam 148 so that the wider side 165 of the cam 148 is in contact with the cam contacting member 158. Because the wider side 165 of the cam 148 takes up more of the space between the headrest support member 102 and the cam contacting member 158, the cam contacting member 158 is forced back into the encasement, thereby increasing the tension on the spring 156. This causes the narrow side 163 of the cam 148 to become more deeply seated in the notch 166, thereby locking the headrest support member 102 more securely into position. In contrast to the prior art, the locking mechanism 132 allows for the use of headrests 106 of differing weights. Furthermore, because the locking mechanism 132 is external to the backrest 104, adjustments can be made without removing the upholstery.

Figure 8:
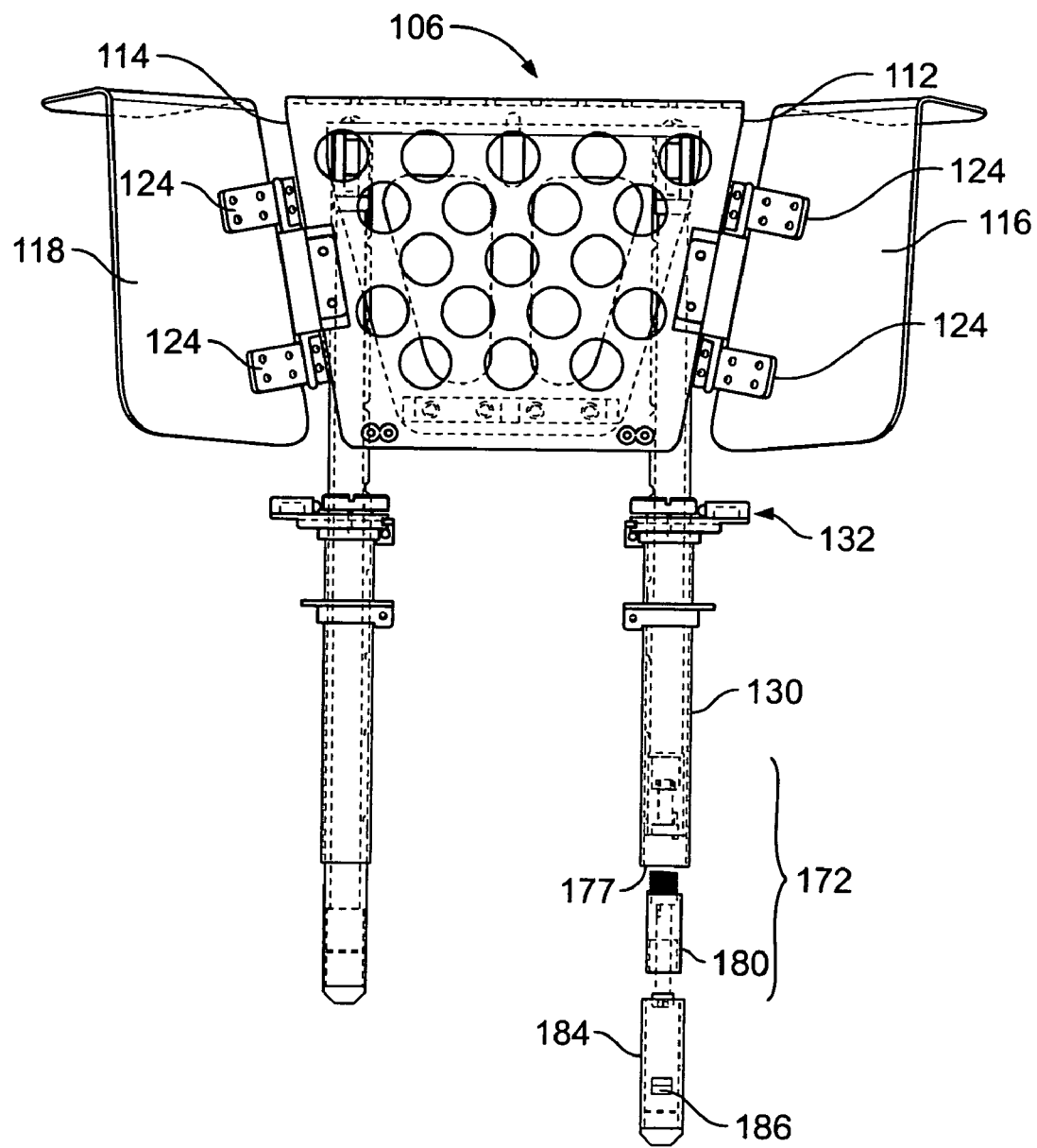
FIG. 8 is a view of the headrest support member showing the interlocking parts in phantom.
Figure 9:
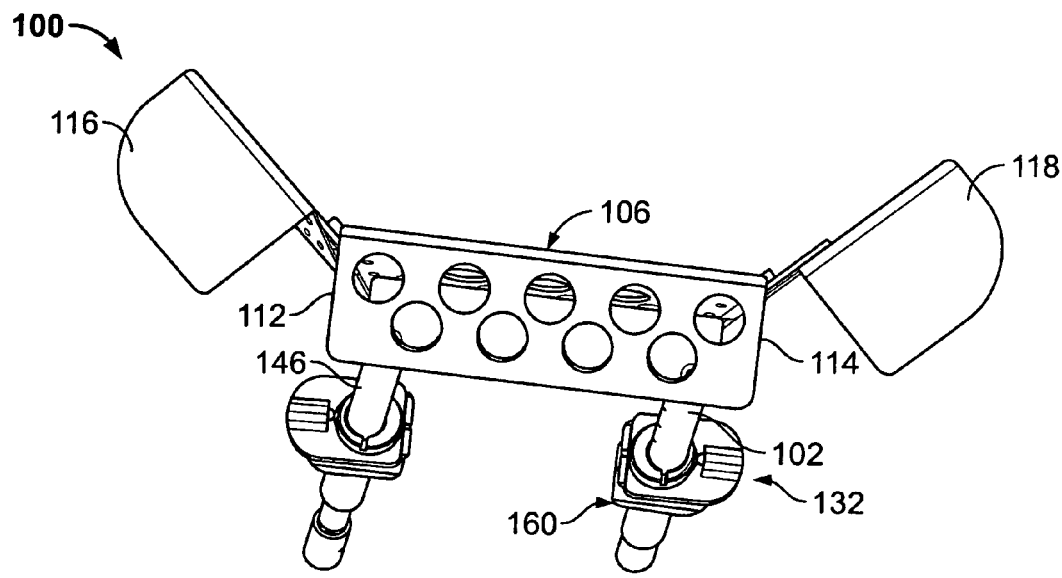
FIG. 9 is a top perspective view of the headrest support member shown in FIG. 1.
Figure 10:
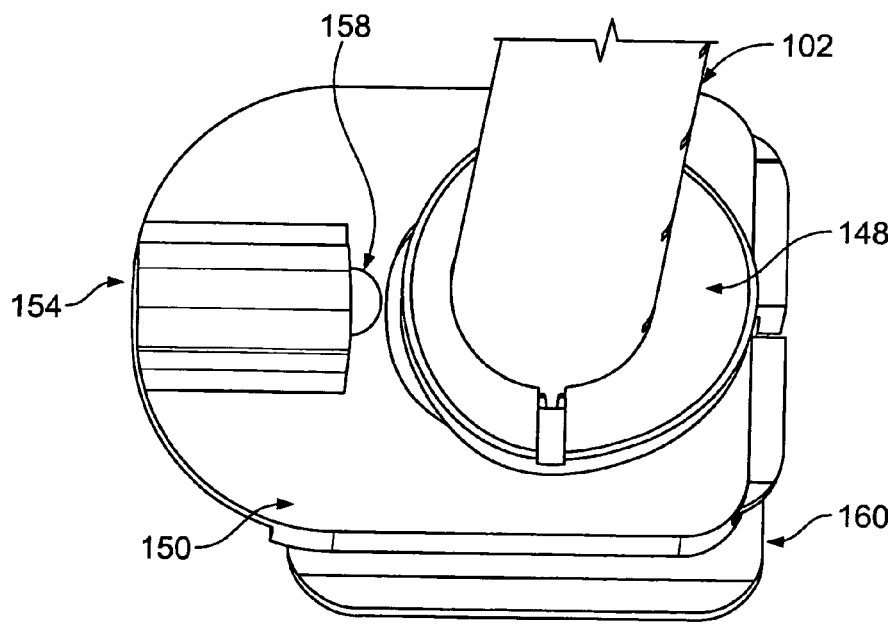
FIG. 10 is a top perspective view showing a locking mechanism according to an embodiment of the present invention.
Figure 20:
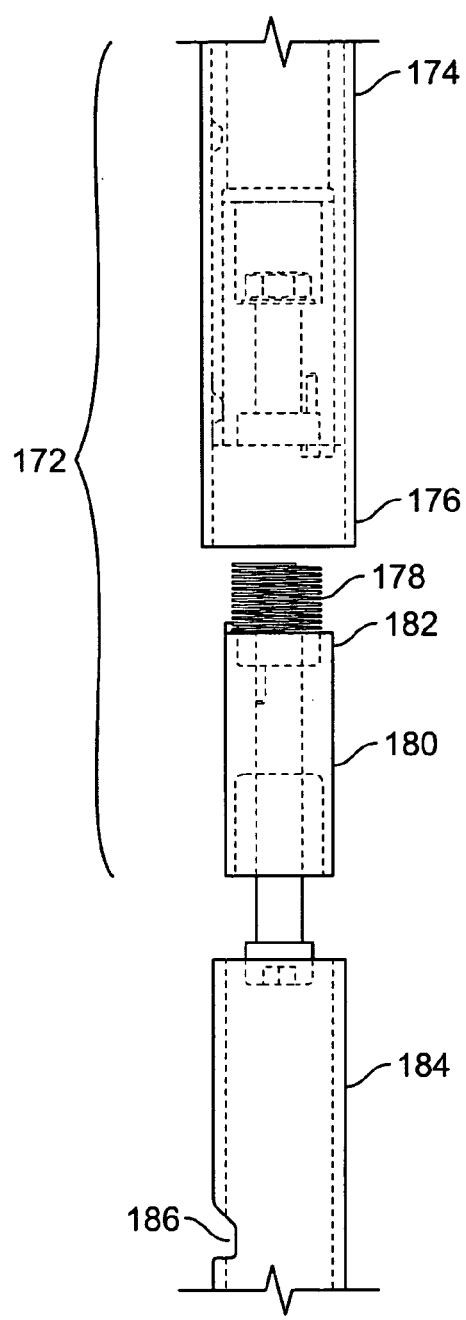
FIG. 20 is a perspective view of the headrest release mechanism showing the first section of the release mechanism in phantom located within the first support bracket of the headrest assembly and the spring positioned on the second section.
Figure 21:
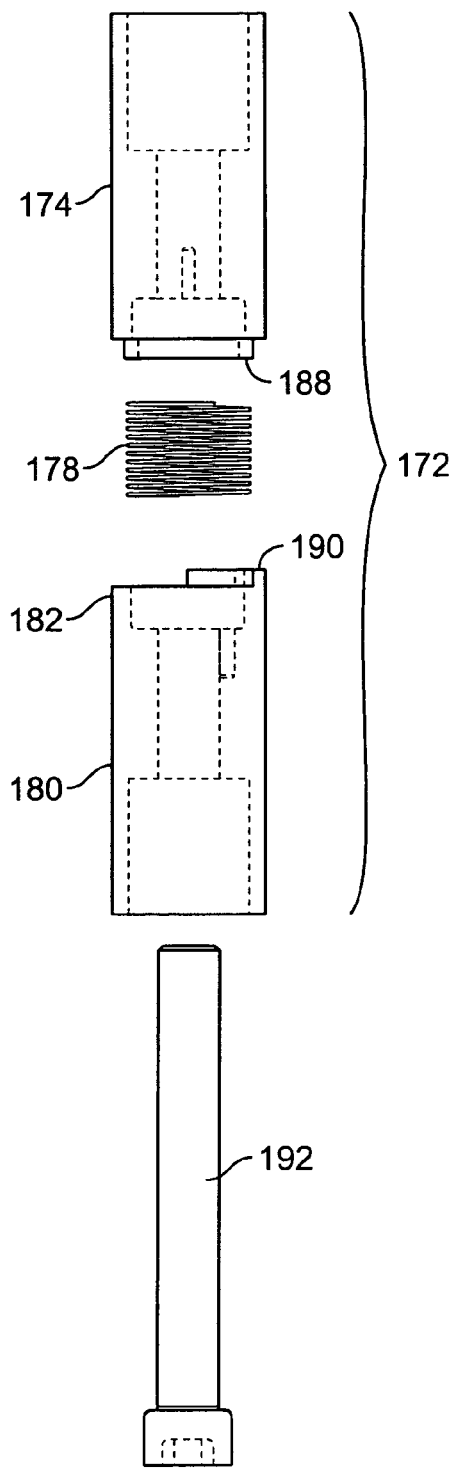
FIG. 21 is an exploded view of the headrest release mechanism.

The invention also is directed to a headrest release mechanism 172, as shown in FIGS. 8 and 20–23. The headrest release mechanism 172, which can be used in conjunction with the locking mechanism 132 and the headrest support member 102, is comprised of a first support housing 130 that is positioned in contact with the headrest release mechanism 172. As shown in FIGS. 20–23, the headrest release mechanism 172 is comprised of a first section 174 having an end portion 176 capable of receiving a spring 178. A second section 180 has an end portion 182 that is proximal to the first section 174 and is also capable of attaching to the spring 178. A second headrest support housing 184 having a notch 186 therein, as shown in FIGS. 8, 11 and 20 is connected to the first support housing 130.

Figure 11:
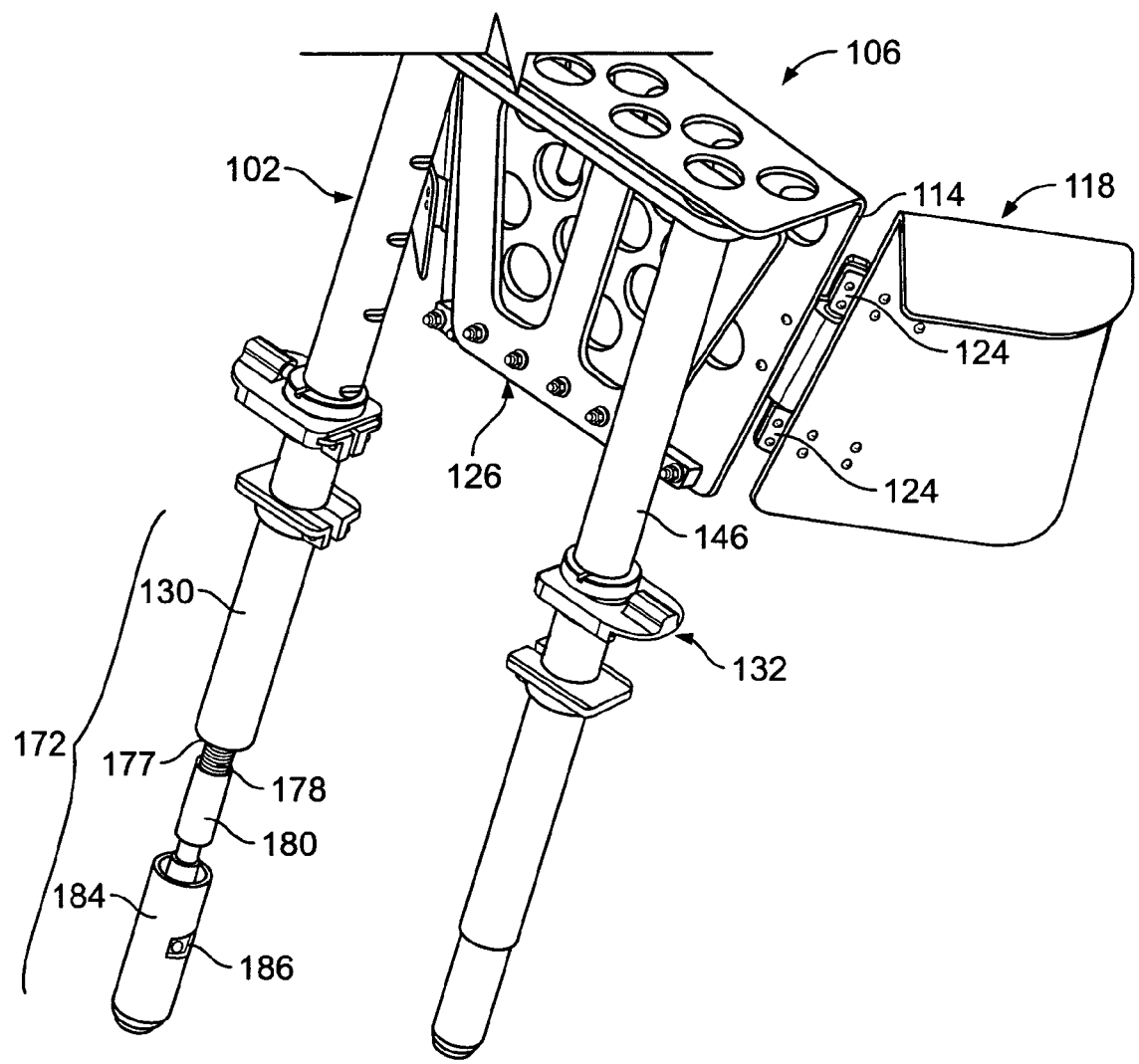
FIG. 11 is a back perspective view of the headrest support assembly showing the extension of one of the headrest support members.

In a specific version of the embodiment, as shown in FIGS. 8 and 11, the first support housing 130 has an opening at one end 177, the first section 174 of the headrest release mechanism 172 is positioned in the opening 177, and the spring 178 is attached to the end portion 176 and partially enclosed by the first section 174.

Each of the first and second sections 174, 180 of the headrest release mechanism 172 can also include an outer edge 188 and 190, respectively. The end portion 176, 182 of each of the sections 174, 180 is recessed from the outer edge 188, 190, respectively. The spring 178 of this headrest release mechanism 172 may also be enclosed by the first and second sections 174, 180 when these sections are mated to each other. The second support housing 184 may also be in a telescopic relationship with the first support housing 130. Additionally, the headrest release mechanism 172 may also provide a connection between the second support housing 184 and the first support housing 130 such that the headrest release mechanism 172 is enclosed within the first and second support housings 130, 184. Furthermore, a bolt 192 may be used to connect the first section 174 of the headrest release mechanism 172 with the second section 180.

When in operation, the edges 188, 190 mate with each other in such a manner as to leave a space between them to allow for a 90° rotation of the second headrest support housing 184. This rotation of the support housing 184 causes the notch 186 to become misaligned with respect to the locking clip 150. As a result, when the headrest assembly 100 is pulled up from the backrest 104, there is no notch 186 for the locking clip 150 to catch, thereby allowing the headrest 106 and its support members 102, 146 to be completely removed from the backrest 104. Once the headrest assembly 100 is removed from the backrest 104, the headrest release mechanism 172 can be released and the spring 178 snaps back into position, thus reorienting the notch 186 to its original position.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A headrest support assembly for use with a seating apparatus that includes a backrest having a top surface, first and second side rails spaced apart from and substantially parallel to one another, and a first support bracket connecting the first side rail to the second side rail, the first support bracket having an opening therethrough, the headrest support assembly comprising:
   a headrest support member positioned in the backrest of the seating apparatus and extending through the opening of the first support bracket;
   a headrest pivotally attached to the headrest support member about an axis substantially parallel to an axis tangent to the top surface of the backrest, the headrest having an inboard and an outboard side;
   a first side headrest portion pivotally connected to the inboard side and a second side headrest portion pivotally connected to the outboard side; and the first and second side headrest portions each pivot about an axis that intersects the axis tangent to the top surface of the backrest.

2. The headrest support assembly of claim 1, wherein the first and second side headrest portions each pivot about an axis that is substantially perpendicular to the axis tangent to the top surface of the backrest.

3. The headrest support assembly of claim 1 wherein the headrest is adjoined to the first and second side headrest portions by at least one hinge.

4. The headrest assembly of claim 1 wherein the headrest support member is at least 12 inches long.

5. The headrest assembly of claim 1 wherein the headrest support member is approximately ¾ inch in diameter.

6. The headrest support assembly of claim 1 further comprising:
   a mounting bracket attached to the headrest support member; and
   the headrest attached to the mounting bracket.

7. The headrest support assembly of claim 1, wherein:
   the backrest defines a plane;
   the headrest support member is positioned in a telescoping relationship with a support housing; and
   the headrest support member is capable of extending in the plane defined by the backrest.

8. The headrest support assembly of claim 7, wherein the headrest support member and the support housing are tubular in shape.

9. The headrest support assembly of claim 7 wherein the support housing is made of plastic.

10. The headrest assembly of claim 1 further comprising a locking mechanism connected to the headrest support member.

11. The headrest support assembly of claim 1 wherein:
    a second support bracket spaced apart from and substantially parallel to the first support bracket connects the first side rail of the backrest, the second support bracket having an opening therein, the opening substantially aligned with the opening in the first support bracket; and
    the headrest support member extends through the opening in the first support bracket and the opening in the second support bracket.

12. A headrest support assembly for use with a seating apparatus that includes a backrest having a top surface, first and second side rails spaced apart from and substantially parallel to one another, and a first support bracket connecting the first side rail to the second side rail, the first support bracket having first and second openings therethrough, the headrest support assembly comprising:
    a first headrest support member positioned in the backrest and extending through one of the first and second openings of the first support bracket;
    a second headrest support member spaced apart from and positioned substantially parallel to the first headrest support member in the backrest, the second headrest support member extending through the other one of the first and second openings of the first support bracket;
    a headrest attached to both of the first and second headrest support members for pivoting about an axis substantially parallel to an axis tangent to the top surface of the backrest, the headrest having an inboard and an outboard side;

a first side headrest portion pivotally connected to the inboard side;

a second side headrest portion pivotally connected to the outboard side; and wherein the first and second side headrest portions pivot about side headrest axes that intersect the axis tangent to the top surface of the backrest.

13. The headrest support assembly of claim 12, wherein:

the side headrest axes are oriented substantially perpendicular to the axis tangent to the top surface of the backrest.

14. A locking mechanism for a seating apparatus including a backrest with a top surface, and a headrest support assembly with a headrest support member that extends through the top surface into the backrest, the locking mechanism comprised of:

a cam above the top surface of the backrest, the cam having an eccentric shape defined by a circumferential edge, and an opening through which the headrest support member extends, the cam being rotatable relative to the headrest support member in a plane parallel to the top surface of the backrest;

a locking clip below the cam, the locking clip having an opening through which the headrest support member extends, and an encasement located proximate to the opening on an upper surface of the locking clip;

a spring located in the encasement; and a cam contacting member positioned in the encasement adjacent to the spring, the cam contacting member moving the locking clip in a plane parallel to the top surface of the backrest relative to rotation of the cam so that the opening in the locking clip engages and disengages the headrest support member.

15. The locking mechanism of claim 14, wherein the opening of the locking clip includes a flat portion distal the encasement and the headrest support member includes a plurality of notches spaced apart along its length, each notch of the plurality of notches being capable of receiving the flat portion of the opening.

16. The locking mechanism of claim 14, wherein the cam and the locking clip are made of plastic.

17. The locking mechanism of claim 14, wherein the cam contacting member is bullet shaped.

18. The locking mechanism of claim 14, wherein:

a support housing surrounds the headrest support member;

the locking clip is connected to the support housing; and the cam is positioned on the locking clip.

19. A headrest release mechanism for a seating apparatus including a backrest having a top surface, a locking mechanism and a headrest support assembly having a headrest support member that extends through the locking mechanism into the backrest for vertically adjusting the headrest support assembly relative to the backrest, the headrest release mechanism comprised of:

a spring including a lower end and an upper end, the upper end attached to a bottom end portion of the headrest support member;

a first member coaxial with the headrest support member and the spring, the first member having an upper end portion attached to the lower end of the spring; and a second member coaxial with and extending downward from the first member, the second member having a notch on an exterior surface thereof that is configured to engage with the locking mechanism, wherein rotation of the first member about an axis defined by a length of the headrest support member disengages the locking mechanism from the notch.

20. The headrest release mechanism of claim 19, wherein:

the first member has a cavity in the upper end portion; and the spring is at least partially enclosed by the cavity.

21. The headrest release mechanism of claim 19, wherein the first and second members are connected with a bolt.

22. The headrest release mechanism of claim 19 wherein the first and second members are configured to rotate approximately 90 degrees relative to the headrest support member about an axis defined by a length of the headrest support member.

23. The headrest release mechanism of claim 19 wherein the spring includes a normal bias that orients the notch for engagement with the locking mechanism.

* * * * *

UNITED STATES PATENT AND TRADEMARK OFFICE
CERTIFICATE OF CORRECTION

| | |
|---|---|
| PATENT NO. | : 7,201,448 B2 |
| APPLICATION NO. | : 10/960353 |
| DATED | : April 10, 2007 |
| INVENTOR(S) | : John Williamson and Pedro Meneses |

It is certified that error appears in the above-identified patent and that said Letters Patent is hereby corrected as shown below:

In Claim 11, Column 8, lines 39-40, change "connects the first side rail of the backrest" to --connects the first side rail to the second side rail of the backrest--.

Signed and Sealed this

Thirty-first Day of July, 2007

JON W. DUDAS
*Director of the United States Patent and Trademark Office*